United States Patent [19]

Sparrow

[11] Patent Number: 5,126,098
[45] Date of Patent: Jun. 30, 1992

[54] METHOD OF STRAIGHTENING A BOWED NUCLEAR FUEL ASSEMBLY

[75] Inventor: James A. Sparrow, Columbia, S.C.

[73] Assignee: Westinghouse Electric Corp., Pittsburgh, Pa.

[21] Appl. No.: 660,479

[22] Filed: Feb. 25, 1991

[51] Int. Cl.$^5$ .............................................. G21C 19/00
[52] U.S. Cl. .................................. 376/261; 376/260; 376/264; 376/434
[58] Field of Search ............... 376/261, 260, 434, 445, 376/264; 72/350; 29/113.2; 976/DIG. 49, DIG. 43

[56] References Cited

U.S. PATENT DOCUMENTS

| | | | |
|---|---|---|---|
| 4,678,625 | 7/1987 | Wilson et al. | 376/261 |
| 4,759,897 | 7/1985 | Tolino et al. | 376/245 |
| 4,788,028 | 11/1988 | Leclerco et al. | 376/262 |
| 4,913,559 | 4/1990 | Meuschke et al. | 376/260 |

Primary Examiner—Brooks H. Hunt
Assistant Examiner—Meena Chelliah

[57] ABSTRACT

A method of removing bow in a nuclear fuel assembly is disclosed. The fuel assembly has top and bottom ends fittings and a plurality of longitudinally extending thimble tube members interconnecting top and bottom end fittings. At least two transverse fuel rod support grids are axially spaced along the thimble tube members. A plurality of fuel rods are transversely spaced and supported by the fuel rod support grids. In one embodiment, a weight of known magnitude is secured on the bottom end fitting and the fuel assembly is raised with the weight secured thereon so that the weight exerts a downward force on the fuel assembly for straightening the fuel assembly and eliminating compressive stresses within the fuel assembly. In another embodiment, the bottom end fitting is secured onto the upender used for transporting fuel assemblies into and out of the containment building and the fuel assembly is pulled for straightening the fuel assembly and eliminating compressive stresses within the fuel assembly.

5 Claims, 5 Drawing Sheets

METHOD OF STRAIGHTENING A BOWED NUCLEAR FUEL ASSEMBLY

FIELD OF THE INVENTION

This invention relates to a method of straightening a bowed nuclear fuel assembly.

BACKGROUND OF THE INVENTION

Nuclear reactor cores contain a large number of nuclear fuel assemblies. Typically the fuel assemblies are approximately twelve feet long, eight and one-half inches square and weigh about 1,500 pounds. The fuel assemblies have top and bottom end fittings (also referred to as nozzles) and a plurality of longitudinally extending thimble tube members interconnecting top and bottom end fittings to form a skeleton framework. Typically, seven or eight transverse fuel rod support grids, are axially spaced along the thimble tube members. A plurality of fuel rods are supported in an organized array by the grids. Each bottom end fitting includes at opposing corners two positioning holes for interfacing onto core pins positioned on the bottom core plate of the nuclear reactor core so that each fuel assembly can be positioned in a predetermined location in closely spaced relation on the core plate. As many as 180 fuel assemblies are contained in some reactor cores.

The fuel assemblies are closely packed under water in the reactor core and a large amount of heat-transfer surface for removal of the high power produced per unit volume is provided. Spacing of the fuel assemblies can be critical and is based on a predetermined inter-assembly water gap.

The fuel assemblies contained in a reactor core are removed from the core during refueling cycles. Typically, about every eighteen months, one-third of the fuel assemblies will be replaced with new fuel assemblies. In another eighteen months, another one-third will be replaced. This cycle repeats approximately every eighteen months. During refueling, all the fuel assemblies are transferred to a separate fuel assembly storage area, also referred to as a spent fuel pit, located adjacent to the containment building surrounding the reactor core. Each fuel assembly is raised by a crane positioned in the containment building and then transferred in vertical orientation onto an upender. The upender typically is supported on narrow gauge rails. The upender is turned to orient the fuel assembly in a horizontal position, and the upender and fuel assembly thereon are transferred on the rail through a small access opening positioned in the wall of the containment building and into the spent fuel pit adjacent to the reactor core. New fuel assemblies are moved into the spent fuel pit and then transferred together with the other two-thirds of the fuel back into the reactor core by the upender. The crane in the containment building places the fuel assemblies onto the proper core pins.

During reactor shut-down and start-up, the fuel assemblies change temperature. Because the zirconium alloy fuel rods contain heavy uranium pellets, the fuel rods cool and heat more slowly than the other zirconium alloy grids and thimble tube members. This differential cooling rate of the fuel rods from the thimble tube members causes an expedited contraction of the thimble tubes. Subsequent contraction of the fuel rods puts the thimble tubes in compression which results in the fuel assembly becoming bowed. This bow can become as large as 0.500 inch over the twelve foot length of the fuel assembly. This amount of bow makes it difficult to interface the bottom end fitting of the fuel assemblies with the core pins during refueling. In severe cases of fuel assembly bow, adjacent fuel assemblies already positioned on core pins can become damaged as bowed fuel assemblies are reinserted into the reactor core. As the crane moves the bowed fuel assembly into position over the core pins, the bowed fuel assembly sometimes will contact other adjacent fuel assemblies and in some cases, damage the other fuel assemblies.

Additionally, a bowed fuel assembly adversely impacts the performance of the nuclear fuel reactor. The inter-assembly water gap may change resulting in higher thermal neutron flux on the outer fuel rods in the reactor. This could lead to reduced thermal margins for the fuel rod cladding and result in plant operational problems. In U.S. Pat. No. 4,678,625 to Wilson et al., a method of straightening bowed irradiated fuel assemblies is disclosed which teaches determining the length adjustment required for shortening the bowed tubular structural member and forming at least an expansion in the bowed member to shorten the length. This method of straightening bowed fuel assemblies is complex. It is more desirable to provide a more simple and less costly method of straightening the bow in a fuel assembly.

SUMMARY OF THE INVENTION

In accordance with the present invention, a method is disclosed of removing the bow in a nuclear fuel assembly. The fuel assembly includes top and bottom end fittings and a plurality of longitudinally extending thimble tube members interconnecting top and bottom end fittings. At least two transverse fuel rod support grids are axially spaced along the thimble tube members, and a plurality of fuel rods are transversely spaced and supported by the fuel rod support grids.

In one embodiment, a weight of known magnitude is secured onto the bottom end fitting. The fuel assembly is raised with the weight secured onto the bottom end fitting so that the weight exerts a downward, longitudinal force onto the fuel assembly for eliminating the compressive stresses previously imparted in the thimble tubes straightening the fuel assembly. In a second embodiment, one of the end fittings is held stationary. The other end fitting is pulled for exerting a longitudinally extending force onto the fuel assembly for eliminating the compressive stresses previously imparted in the thimble tubes straightening the fuel assembly. This can be accomplished when the fuel assembly is moved onto the upender used in transporting fuel assemblies into the containment building. The bottom end fitting is secured to the upender and the fuel assembly is pulled with a predetermined amount for straightening the fuel assembly.

In the method of the present invention, a fuel assembly is transferred from a fuel assembly storage area, i.e., the spent fuel pit, and onto the upender. The upender is moved into the containment building where it is upended so that the fuel assembly is positioned in a vertical orientation. In the first embodiment the fuel assembly is moved onto a weight positioned in the containment building and secured thereto. The fuel assembly then is lifted. Alternatively, the bottom end fitting of the fuel assembly is pulled upward while the bottom end fitting is secured to the upender for straightening the fuel assembly.

BRIEF DESCRIPTION OF THE DRAWINGS

Some of the advantages of the present invention having been stated, other advantages will appear as the description proceeds when taken in conjunction with the accompanying drawings in which.

DETAILED DESCRIPTION OF THE PREFERRED EMBODIMENTS

Figure 1:
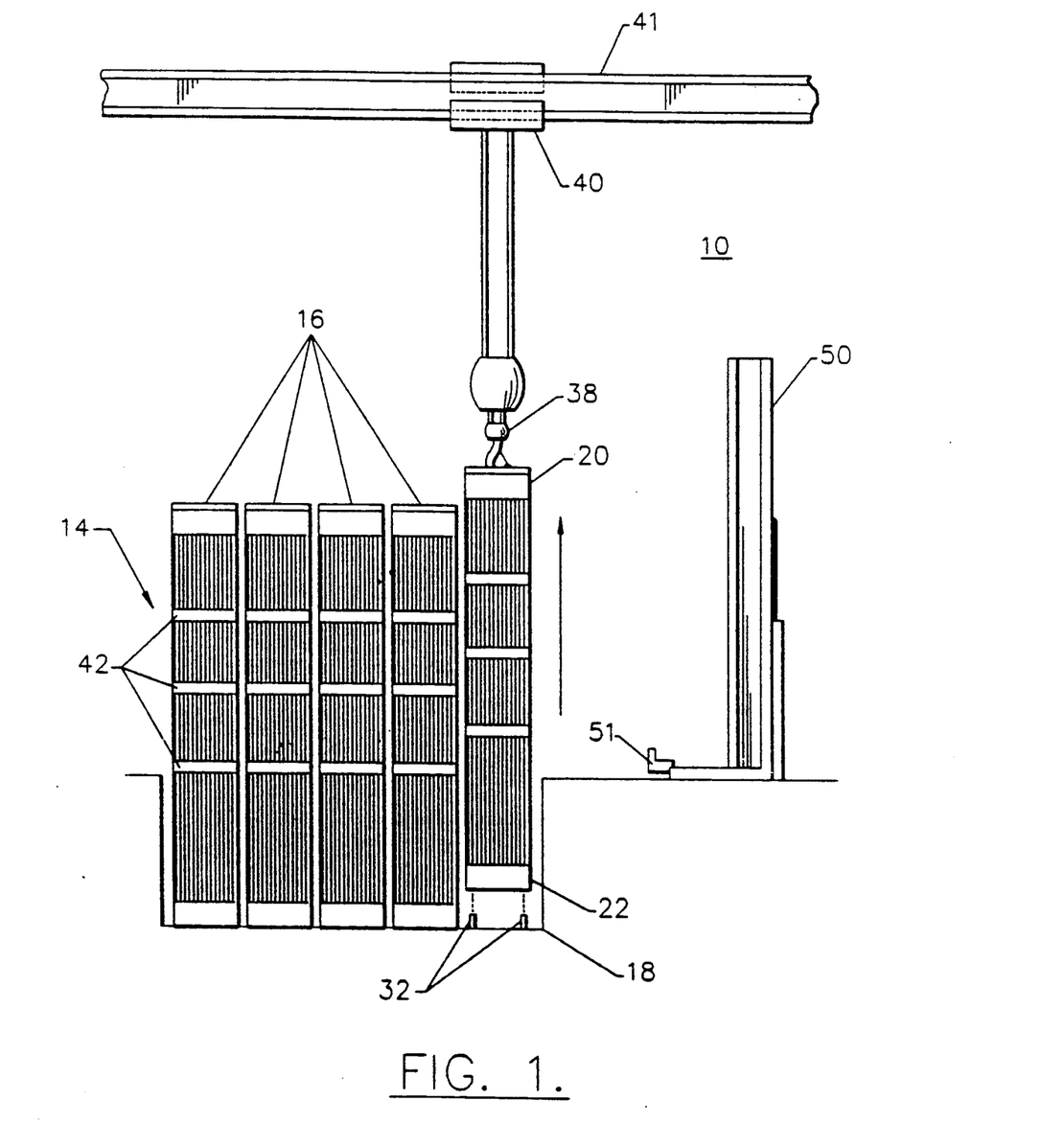
FIG. 1 is a schematic view illustrating an upender positioned in the containment building and the polar crane raising a fuel assembly shown in schematic out of the reactor core.
Figure 2:
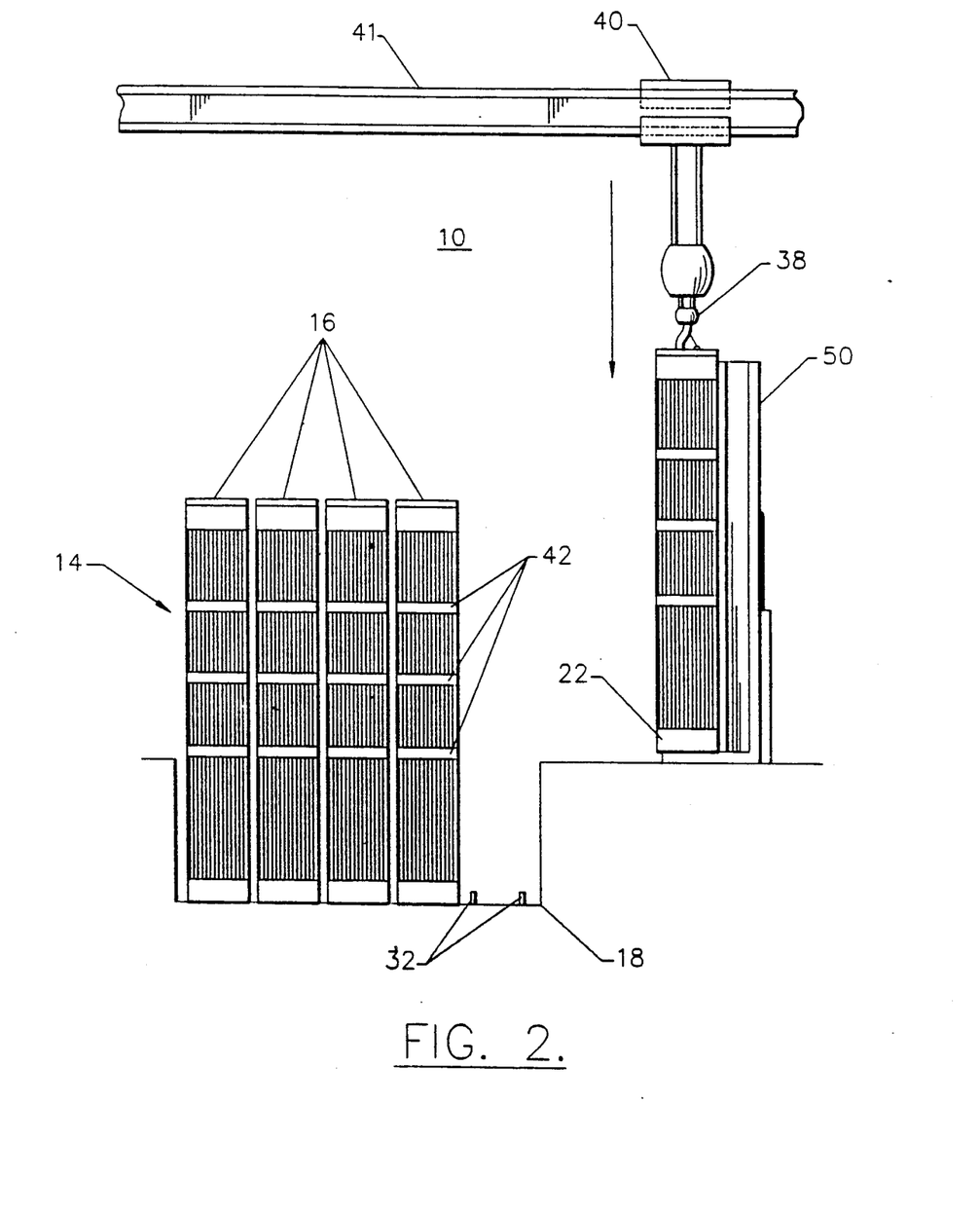
FIG. 2 is a view similar to FIG. 1 and showing the raised fuel assembly being lowered onto the upender.
Figure 3:
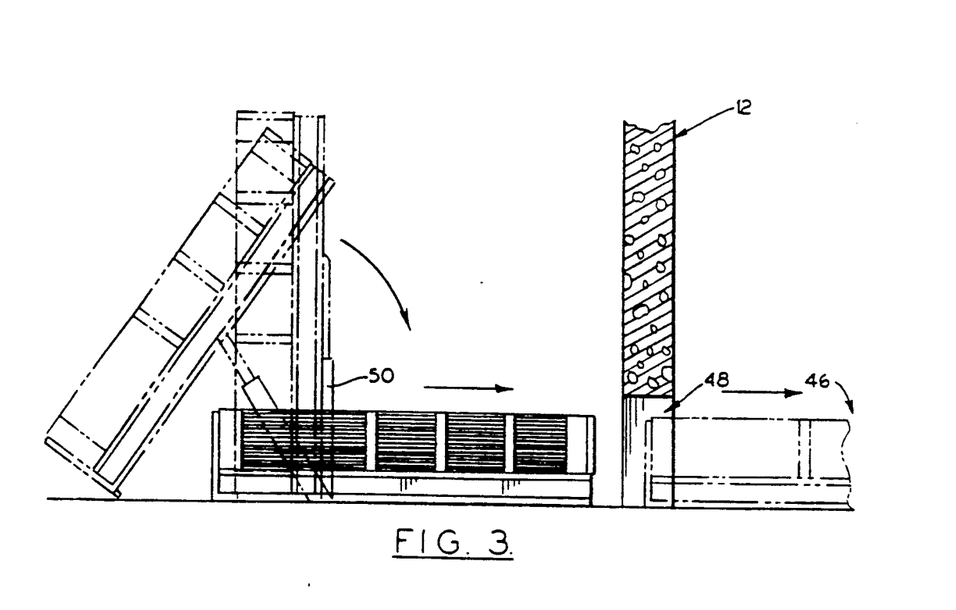
FIG. 3 shows the fuel assembly and upender being lowered and transferred through the access opening of the containment building and into the spent fuel pit located adjacent the containment building.
Figure 4:
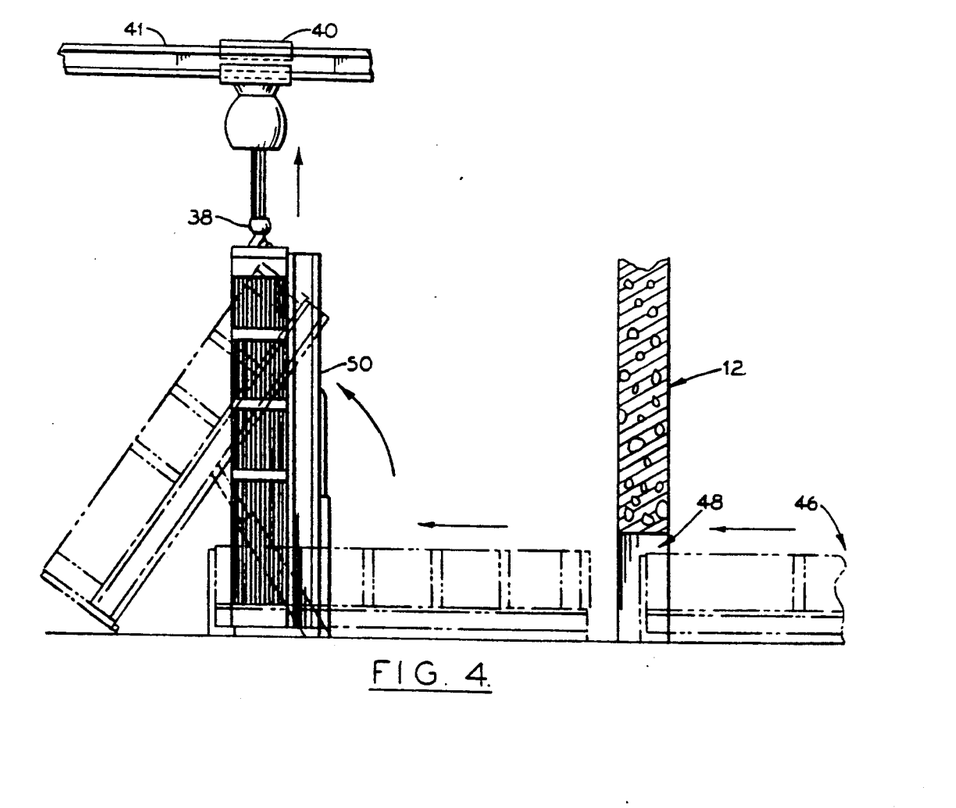
FIG. 4 is a schematic view similar to FIG. 3 and showing transfer of the upender and a fuel assembly into the containment building, the upender being raised, and the fuel assembly pulled by the crane for exerting a straightening force on the fuel assembly.

Referring now to FIGS. 1 through 3, there is disclosed a schematic representation of a portion of a nuclear fuel reactor illustrated generally at 10. As is common with most nuclear fuel reactors 10, the reactor includes a containment building having a portion illustrated generally by the wall marked 12. The reactor core is positioned in the containment building and indicated generally at 14. Although not illustrated in detail, the reactor core 14 is shown as having a plurality of individual fuel assemblies indicated at 16, grouped together under water in the reactor core 14. The fuel assemblies are illustrated in schematic in FIGS. 1–6. Details of the construction are better shown in FIGS. 7 and 8.

The fuel assemblies 16 are spaced closely together and a large amount of heat-transfer surface for removal of the high power produced per unit volume is provided. Spacing of the fuel assemblies 16 is critical and is based on a predetermined inter-assembly water gap. Typically, the reactor core includes a bottom core plate 18 on which the fuel assemblies 16 rest, and a pressure vessel (not shown) in which the fuel assemblies are contained. In one typical nuclear fuel reactor, about 180 fuel assemblies are provided inside the reactor core. The reactor core is under water (not shown).

Figure 5:
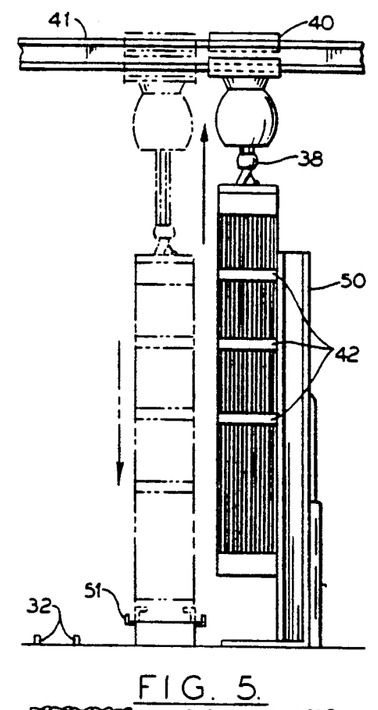
FIG. 5 is a schematic view showing a fuel assembly being raised off the upender and onto a weight positioned in the containment building.
Figure 6:
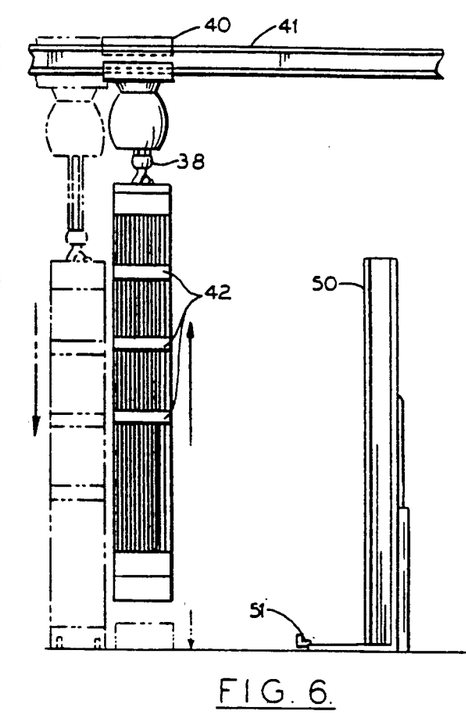
FIG. 6 is a view similar to FIG. 5 and showing the weight secured to the bottom end fitting and the fuel assembly being lifted in accordance with the present invention.

Each of the fuel assemblies 16 typically are twelve feet long, eight and one-half inches square, and include respective top and bottom end fittings 20, 22 which commonly are referred to in the industry as nozzles. The end fittings 20, 22 are formed of a zirconium alloy. The bottom end fitting 22 is substantially rectangular configured and includes a main thimble tube member support plate 24 having at each corner a leg 26 extending downward for allowing the bottom end fitting 22 to rest on the bottom core plate 18. Two diagonally opposing legs include core pin receiving holes 30 (FIG. 7) which are dimensioned to receive core pins 32 secured on the bottom core plate 18 for positioning a fuel assembly 16 in the reactor core 14 (FIG. 5).

Thimble tube members 34 interconnect top and bottom end fittings 20, 22 and form a fuel rod support skeleton framework. The thimble tube members 34 also are formed of a zirconium alloy material. The top end fitting 20 includes a receiving member 36 (FIG. 8) for receiving the hook 38 of a polar crane 40 positioned in the containment building (FIGS. 3 and 4) and a crane (not shown) in areas adjacent the containment building, such as loading areas. The crane 40 is rolled on overhead rails 41 as is conventional in the industry. The thimble tube members 34 support a plurality of axially spaced fuel rod support grids 42, commonly referred to as grids. Typically, as many as seven or eight equally spaced, transverse support grids 42 interconnect the thimble tube members 34. For descriptive purposes of the present invention only three support grids 42 are illustrated.

Figure 7:
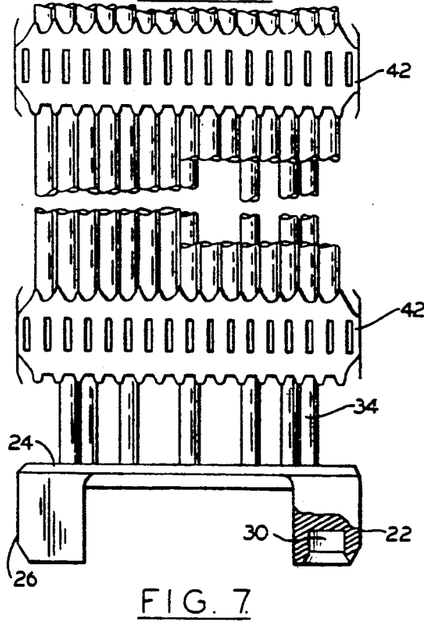
FIG. 7 is a side elevational view of the bottom portion of the fuel assembly showing the bottom end fitting, thimble tube members, fuel rod support grids, and fuel rods supported by the support grids.
Figure 8:
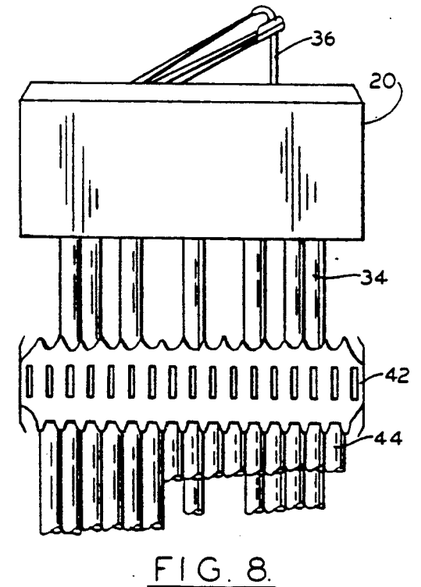
FIG. 8 is a side elevational view of a top portion of the fuel assembly, showing the top end fitting, thimble tube members, fuel rod support grids and fuel rods supported by the support grids.

A plurality of fuel rods 44 are supported by the support grids 42 as illustrated in FIG. 7 and 8. The fuel rods 44 also are formed of a zirconium alloy material and typically are about 0.375 to 0.400 inches in diameter. As many as fifteen to seventeen fuel rods 44 are supported in spaced relation to each other by the support grids 42. As a unit the total fuel assembly weighs approximately 1,300 pounds and typically is flexible, so that heavy force, such as exerted by a individual against the fuel assembly 16 can create a buckle in the fuel assembly.

After manufacturing a completed fuel assembly in a nuclear fuel processing plant, each fuel assembly 16 is placed into a shipping container and shipped to the nuclear fuel reactor location. The fuel assembly 16 is transferred into a fuel assembly storage area indicated generally at 46, commonly referred to as the spent fuel pit. The spent fuel pit 46 is located adjacent the containment building 12 and is connected to the containment building by means of an access opening 48 in the containment building wall. The access opening 48 is normally closed during reactor operation. A upender, indicated at 50, is movable between the spent fuel pit 46 and the containment building 12 on rails (not shown in detail). Fuel assemblies 16 are placed on the upender 50 which is moved in a horizontal position while contained in the spent fuel pit 46. The upender 50 and fuel assembly 16 then can be moved in the containment building 17. The access opening 48 is small only to allow transfer of fuel assemblies 16 into and out of the containment building 12 when the upender 50 is positioned in a horizontal position.

When the reactor core is to be fueled with new, unused fuel assemblies, a crane (not shown) positioned in the spent fuel pit 46 raises a fuel assembly positioned in the spent fuel pit and places the fuel assembly on the upender positioned in the spent fuel pit. The upender 50 and fuel assembly 16 are moved into a horizontal position, i.e., downended, and then are transferred through the containment building, through the access opening 48 and into the containment building 12. Typically, the upender 50 is supported on rails (not shown) extending from the interior of the containment building, through the access opening 48 and into the spent fuel pit 46.

After the upender 50 and fuel assembly 16 have been transferred into the containment building 12, the upender 50 then is rotated ninety degrees to place the upender and fuel assembly in a vertical orientation within the containment building 12. The polar crane 40 which is positioned in the containment building 12 then lifts the fuel assembly off the upender and positions the fuel assembly in the reactor core 14 at a predetermined location. The reactor core typically includes a top core plate (not shown) which is removed to expose the bottom core plate 18. The bottom core plate 18 includes a plurality of core pins 32 adapted to receive the core pin receiving holes 30 located on the bottom end fittings 22 of the fuel assemblies 16. The core pins 32 are precisely spaced to assure proper spacing of fuel assemblies 16 in the reactor core 14. This cycle of moving individual fuel assemblies 16 from the spent fuel pit 46, into the containment building 12 and into the reactor core by means of the upender 50 and polar crane 40 is repeated for each fuel assembly until the reactor core is fueled. The reactor then is prepared for operation.

A fuel assembly 16 has an operating life of approximately four and one-half years. Typically, about one third of the fuel assemblies 16 are replaced approximately every eighteen months. During refueling every eighteen months, all fuel assemblies 16 are transferred out of the containment building 12 and into the spent fuel pit 46. Individual fuel assemblies are moved by the crane 40 onto the upender 50 positioned in the containment building 12. The upender 50 is rotated ninety degrees, i.e., downended, and then transferred through the containment building access opening 48 into the spent fuel pit 46. During this process, the nuclear fuel reactor 10 is shut-down. During refueling of the reactor core 14, a preselected two-thirds of the fuel assemblies are moved from the spent fuel pit 46 and transferred back into the containment building 12 by means of the upender 50. The fuel assemblies 16 are loaded by the polar crane 40 into respective positions in the reactor core 14. A new one-third group of fuel assemblies which have not previously been used in the reactor core also are transferred on the upender 50 into the containment building 12 and then moved by the polar crane 40 into position in the reactor core 14.

Figure 9:
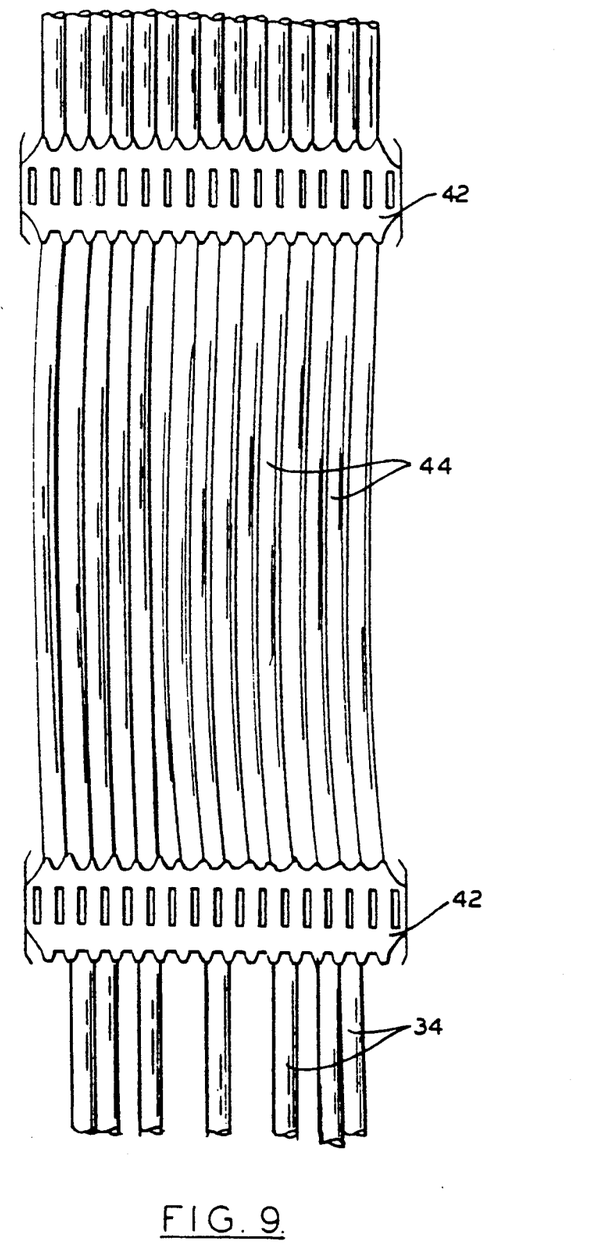
FIG. 9 is a side elevational view of a fuel assembly showing by exaggeration the bow of the fuel assembly.

During the refueling process, it has been found that some of the fuel assemblies 16 which have not been replaced become bowed by as much as 0.500 inches and more. As shown in FIG. 9, in an exaggerated view of the bow in a fuel assembly, the bow places many of the fuel assembly members in compression. At first, it was suggested that such bowing occurred because of the natural creep of the zirconium alloy. However, it was determined that the bowing occurred because of the differential cooling rate of the fuel rods from the thimble tube members. Differential stresses occur in the thimble tube members 34 and fuel rods 44. Even though the coefficient of thermal expansion for the thimble tube members 34 and fuel rods 44 is the same in the zirconium alloy metal, it was determined that during refueling when the reactor and fuel assemblies located therein are cooled, the thimble tube members 34 cool at a rate different from the fuel rods which contain heavy uranium pellets. When the nuclear reactor fuel core 14 is shut-down, the thimble tube members cool faster than the fuel rods. This disproportionate cooling causes an expedited construction of the thimble tube members 34. A few hours later, when the fuel rods 44 cool down to ambient temperature, their length decreases and the fuel rods place the thimble tube members 34 into compression, which results in the fuel assembly becoming bowed by as much as 0.500 inches.

Later, when the fuel assemblies 16 are transferred into the containment building and then into predetermined positions in the reactor core, the heavily bowed fuel assemblies can knock adjacent fuel assemblies already positioned on respective core pins in the reactor core. The fuel assemblies are closely spaced. Thus, the bottom end fittings are close together and when a bowed fuel assembly is moved adjacent the other fuel assemblies positioned in the reactor core 14, the bottom end fitting 22 may contact and damage the bottom end fitting of a fuel rod assembly 16 already positioned on the bottom core plate 18. Also, under these circumstances, a crane operator finds it very difficult to lower the fuel assembly 16 onto the proper core pins 32. The positioning of the fuel assemblies is made even more difficult by the fact that the positioning must be accomplished under water. Sometimes, other adjacent fuel assemblies must be raised to permit the interface of a heavily bowed fuel assembly onto the core pins 32. Additionally, a bowed fuel assembly adversely impacts the performance of the nuclear fuel reactor. The fuel assemblies are under water and the inter-assembly water gap may change when a bowed fuel assembly is placed into the reactor core resulting in higher thermal neutron flux on the outer fuel rods. This can lead to reduced thermal margins for the fuel rod cladding and can result in plant operational problems.

The method in accordance with the present invention removes much of the bow on a fuel assembly. It has been determined that pulling with a predetermined force on top and bottom end fittings 20, 22 can straighten the fuel assembly and eliminate compressive stresses within the fuel assembly. This can be accomplished by two primary embodiments. In the first, after the fuel assembly 16 has been transferred in a prone, horizontal position on the upender 50 through the access opening 48 into the containment building 12, the fuel assembly 16 is pulled by the polar crane 40, preferably in a vertical orientation (FIG. 4), when the bottom end fitting 22 is secured to the upender by appropriate means such as attachment bars 51 which secure the bottom end fitting onto the upender. The attachment bars can include means for moving the attachment bars into engagement with the movement means. The movement means can be activated by radio signals transmitted from the crane. The amount of pull exerted by the polar crane will be adjusted to exert a total force of approximately three to four thousand pounds of force. An additional amount of force may cause the top end fitting 20 to separate from the assembly and thimble tube members.

In a second embodiment, the fuel assembly can be lifted off the upender 50 after transfer into the containment building and positioned on top of a weight 52 (FIGS. 5 and 6) of predetermined magnitude having means for securing the weight to the bottom end fitting such as the attachment bars, illustrated at 51, as described before. Preferably the weight is approximately three to four thousand pounds. The fuel assembly then is lifted after the weight has been secured to the bottom end fitting.

It has been determined that a weight greater than four thousand pounds may cause the top end fitting 20 to separate from the thimble tube members. If this occurs, the damaged fuel assembly will cause considerable problems in the reactor core 14 such as damage to other fuel assemblies. Additionally, the damaged fuel assembly 16 will be more difficult to remove. If the fuel assembly is bowed approximately 0.500 inches, the method in accordance with the present invention can remove as much as fifty to one hundred percent of the bow. It has been determined that removing the bow to around 0.050 inches of total bow in a fuel assembly has been found acceptable in many cases and will result in a straightened fuel assembly which in most cases can be placed onto core pins without damaging adjacent fuel assemblies already positioned on the core plate.

Additionally, when the fuel assembly 16 is positioned in a horizontal position and the upender transferred from the spent fuel pit 46, through the access opening 48 and into the containment building 12, the fuel assembly bottom end fitting 22 can be secured onto the upender and the top end fitting 20 pulled. However, pulling horizontally on the fuel assembly 16 is not as desirable because in the reactor environment of the containment building and in the spent fuel pit, it is difficult to provide means for exerting a horizontal force.

The bottom end fitting 22 also could be secured in other preselected positions in the containment building 12 and then pulled. However, securing the bottom end fitting 22 to a preselected position such as the upender 50 or another position is not as desirable as securing a weight 52 to the bottom end fitting 22. One of the chief advantages of securing a weight onto the bottom end fitting and pulling is the certainty of the weight magnitude the separate weight 52 provides as compared to pulling the fuel assembly secured to an upender with the polar crane. A weight of predetermined magnitude always can be used resulting in the application of a constant, known force to each fuel assembly.

The foregoing embodiments are to be considered illustrative, rather than restrictive of the invention and the modifications which come within the meaning and range of equivalence of the claims are to be included therein.

I claim:

1. A method of removing the bow in a nuclear fuel assembly, said fuel assembly having top and bottom end fittings, a plurality of longitudinally extending thimble tube members interconnecting top and bottom end fittings, at least two transverse fuel rod support grids axially spaced along the thimble tube members, and a plurality of fuel rods transversely spaced and supported by the fuel rod support grids, the method comprising the steps of securing a weight body having a weight of between about three thousand and four thousand pounds onto the bottom end fitting while the nuclear fuel assembly is positioned under water within the containment building and raising the fuel assembly vertically along the longitudinal axis of the nuclear fuel assembly with the weight body secured onto the bottom end fitting so that the weight exerts a downward force onto the fuel assembly for substantially straightening the fuel assembly and eliminating most of the compressive stresses within the fuel assembly.

2. A method of removing the bow in a nuclear fuel assembly, said fuel assembly having top and bottom end fittings, a plurality of longitudinally extending thimble tube members interconnecting top and bottom end fittings, at least two transverse fuel rod support grids axially spaced along the thimble tube members, and a plurality of fuel rods transversely spaced and supported by the fuel rod support grids, the method comprising the steps of securing the bottom end fitting to a predetermined location under water within the containment building of a nuclear fuel reactor and pulling vertically upward along the longitudinal axis of the nuclear fuel assembly with a force on the top end fitting so that a force of between three thousand and four thousand pounds is exerted on the nuclear fuel assembly for substantially straightening the fuel assembly and eliminating most of the compressive stresses within the fuel assembly.

3. A method of removing the bow in a nuclear fuel assembly, said fuel assembly having top and bottom end fittings, a plurality of longitudinally extending thimble tube members interconnecting top and bottom end fittings, at least two transverse fuel rod support grids axially spaced along the thimble tube members, and a plurality of fuel rods transversely spaced and supported by the fuel rod support grids, the method comprising the steps of securing the bottom end fitting to a vertically oriented upender used for transporting fuel assemblies into and out of the containment building of the nuclear fuel reactor while the upender is positioned under water within the containment building, and pulling on the top end fitting vertically upward along the longitudinal axis of the nuclear fuel assembly with a force so that a force of between three and four thousand pounds is exerted on the nuclear fuel assembly for substantially straightening the fuel assembly and eliminating most of the compressive stresses within the fuel assembly.

4. A method of removing the bow in a nuclear fuel assembly, said fuel assembly having top and bottom end fittings, a plurality of longitudinally extending thimble tube members interconnecting top and bottom end fittings, at least two transverse fuel rod support grids axially spaced along the thimble tube members, and a plurality of fuel rods transversely spaced and supported by the fuel rod support grids, the method comprising the steps of transferring the fuel assembly from a fuel assembly storage area adjacent to the containment building of a nuclear fuel reactor and onto an upender positioned in the fuel assembly storage area, moving the upender into the containment building, upending the fuel assembly so that the fuel assembly is positioned in vertical orientation under water and within the containment building, securing the bottom end fitting onto the upender, and pulling vertically upward along the longitudinal axis of the nuclear fuel assembly with a force on the top end fitting so that a force of between three thousand and four thousand pounds is exerted on the nuclear fuel assembly for substantially straightening the fuel assembly and eliminating most of the compressive stresses within the fuel assembly.

5. A method of removing the bow in a nuclear fuel assembly, said fuel assembly having top and bottom end fittings, a plurality of longitudinally extending thimble tube members interconnecting top and bottom end fittings, at least two transverse fuel rod support grids axially spaced along the thimble tube members, and a plurality of fuel rods transversely spaced and supported by the fuel rod support grids, the method comprising the steps of transferring the fuel assembly from a fuel assembly storage area adjacent the containment building of a nuclear fuel reactor and onto an upender positioned within the storage area, moving the upender into the containment building, upending the fuel assembly so that the fuel assembly is positioned in a vertical orientation under the water held within the containment building, raising the fuel assembly off the upender, lowering the fuel assembly onto a weight body having a weight in the range of between three thousand and four thousand pounds and which is positioned on the core plate floor within the containment building, securing the bottom end fitting onto the weight body, and raising the fuel assembly vertically upward in a direction substantially along the longitudinal axis of the fuel assembly while maintaining the fuel assembly under water and with the weight body attached thereto so that the weight body exerts a downward force onto the fuel assembly for substantially straightening the fuel assembly and eliminating most of the compressive stresses within the fuel assembly.

* * * * *